No. 833,848. PATENTED OCT. 23, 1906.
W. D. RUNDLETT.
GEARING.
APPLICATION FILED AUG. 17, 1905.
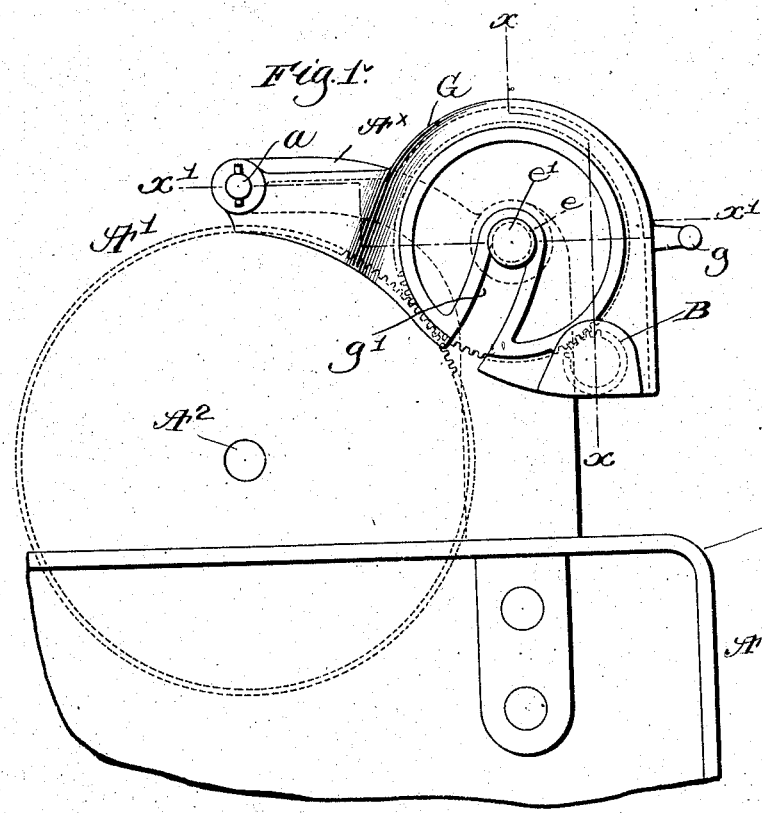
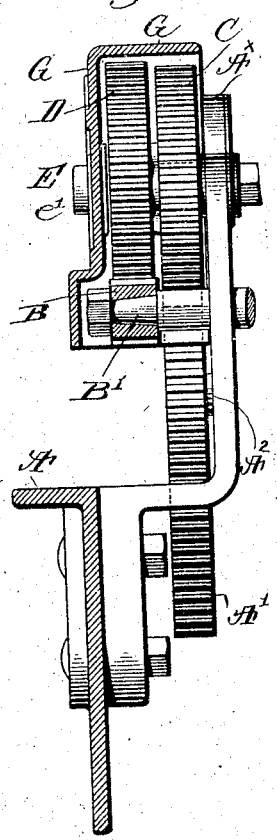
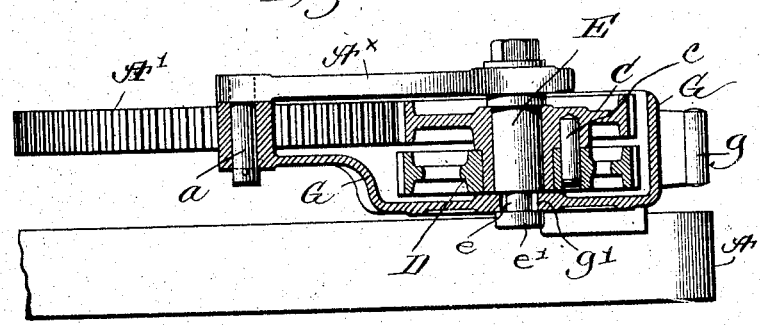
Witnesses.
S. Wm. Lutton
Edward H. Allen
Inventor.
William D. Rundlett,
by Crosby Gregory
Attys

UNITED STATES PATENT OFFICE.

WILLIAM D. RUNDLETT, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

GEARING.

No. 833,848.

Specification of Letters Patent.

Patented Oct. 23, 1906.

Application filed August 17, 1905. Serial No. 274,532.

*To all whom it may concern:*

Be it known that I, WILLIAM D. RUNDLETT, a citizen of the United States, residing at North Andover, county of Essex, and State of Massachusetts, have invented an Improvement in Gearing, of which the following description, in connection with the accompanying drawings, is a specification, like letters on the drawings representing like parts.

This invention in gearing has for its object novel means for retaining gears in working position and for facilitating changing gears when for any reason it is desired to renew a gear or effect a change of speed.

The means shown as comprehending my invention also acts as a shield to inclose the gearing.

Figure 1 shows my invention in side elevation; Fig. 2, a section thereof in the irregular dotted line $x$, and Fig. 3 a section in the irregular dotted line $x'$.

The frame part A A$^\times$, the toothed wheel A', carried by a shaft or stud A$^2$, and the smaller toothed wheel or pinion B on the shaft B' are and may be as usual, and either of the toothed wheels may be the driver. Between these toothed wheels are two gears C D, varying in diameter, and said gears are herein represented as change or intermediate gears, and the wheel B on the driven shaft B' is represented as driving the wheel A' through the wheels D C.

The gears C D are sustained by and turned about a stud E, having near its free end a notch or groove $e$ to leave a head $e'$. The stud E is sustained by the frame part A$^\times$, the latter having a stud $a$, on which is pivoted loosely a device or gear-retainer G, shown as provided with a projection $g$ for convenience in raising and lowering said device.

I have shown the hub of gear C as surrounding the stud E loosely, and said hub is prolonged and receives the gear D. The two gears C D are united by a pin $c$, so that whichever gear, C or D, is driven, the other gear is moved in unison with it and becomes the driver for the next gear of the train in which the two gears C and D are employed.

Usually gears running on studs are retained thereon by nuts fitted to the stud, and if a gear is to be changed to change speed or remove a broken or worn gear a wrench has to be employed to remove the nut, so that considerable time is lost in so doing.

In the absence of a better term the device G may be designated as a "gear-retainer," and when either or both gears C or D are to be changed it is only necessary to disengage the device G from said stud, said device being slotted at $g'$ and embracing the stud E and entering a notch or groove $e$ in said stud behind the head $e'$. The withdrawal of the device G leaves the gears free to be withdrawn from the stud. I have herein shown the device G as turned upwardly above its pivot $a$; but this invention is not limited to the exact way shown of sustaining said device. It will also be noted that the device G is shaped to embrace, inclose, and act as a shield for the gears C and D on the pinion B.

I have shown the two gears C D as separable; but my invention would not be departed from if said gears were fixed together or made as one piece.

Having fully described my invention, what I claim as new, and desire to secure by Letters Patent, is—

1. In gearing, a driving and a driven wheel, gears in engagement with said wheels, a stud sustaining said gears, and a slotted device coacting with said stud and retaining said gears in their operative position thereon.

2. In gearing, two toothed gears, a stud sustaining said gears side by side, means for operatively connecting said gears, and a slotted gear-retainer coacting with said stud to retain said gears thereon, the movement of said retainer transversely of the longitudinal axis of said stud leaving said gears free to be withdrawn from said stud.

3. In gearing, a stud having a groove at its outer end, a gear sustained by said stud, and a shield device covering said gear and engaging loosely the groove of said stud.

In testimony whereof I have signed my name to this specification in the presence of two subscribing witnesses.

WILLIAM D. RUNDLETT.

Witnesses:
GEO. W. GREGORY,
MARGARET A. DUNN.